United States Patent [19]

Nishii et al.

[11] Patent Number: 5,526,191
[45] Date of Patent: Jun. 11, 1996

[54] FOURIER TRANSFORM LENS ASSEMBLY

[75] Inventors: Kanji Nishii, Osaka; Masami Ito, Moriguchi; Atsushi Fukui, Osaka, all of Japan

[73] Assignee: Matsushita Electric Industrial Co., Ltd., Osaka-fu, Japan

[21] Appl. No.: 321,223

[22] Filed: Oct. 11, 1994

Related U.S. Application Data

[62] Division of Ser. No. 952,269, Sep. 28, 1992, Pat. No. 5,383,056.

[30] Foreign Application Priority Data

Sep. 30, 1991 [JP] Japan ................. 3-251106

[51] Int. Cl.[6] ................................ G02B 9/62
[52] U.S. Cl. ................. 359/757; 359/786; 359/787; 359/788; 359/809
[58] Field of Search ................. 359/737, 744, 359/784, 785, 786, 787, 788, 809, 673, 765, 789, 790, 749, 753, 423, 434, 435, 728, 708, 663, 757, 771, 772, 775

[56] References Cited

U.S. PATENT DOCUMENTS

| | | | |
|---|---|---|---|
| 2,235,364 | 3/1941 | Gramatzki | 359/673 |
| 2,979,988 | 4/1961 | Aklin | 359/737 |
| 4,095,873 | 6/1978 | Takahiro | 359/749 |
| 4,189,214 | 2/1980 | Matsui et al. | 359/761 |
| 4,240,697 | 12/1980 | Takano | 359/674 |
| 4,453,800 | 6/1984 | Fjeldsted | 359/744 |
| 4,518,231 | 5/1985 | Muchel et al. | 359/737 |
| 4,610,516 | 9/1986 | Yokota | 359/785 |
| 4,732,459 | 3/1988 | Hayashi | 359/785 |
| 4,742,219 | 5/1988 | Ando | 359/737 |
| 4,831,333 | 5/1989 | Welch | 3/38 |
| 4,846,550 | 7/1989 | Schuma et al. | 359/737 |
| 4,854,679 | 8/1989 | Tsuji | 359/673 |
| 4,856,884 | 8/1989 | Fender et al. | 359/559 |
| 4,877,314 | 10/1989 | Kanamori | 359/673 |
| 4,973,995 | 11/1990 | Kato et al. | 354/79 |
| 4,997,250 | 3/1991 | Oritz, Jr. | 359/737 |

FOREIGN PATENT DOCUMENTS

| | | | |
|---|---|---|---|
| 0149118 | 7/1985 | European Pat. Off. | G02B 27/64 |
| 2552263 | 9/1976 | Germany | G02B 27/46 |
| 3431977 | 4/1985 | Germany | 359/765 |
| 2-132412 | 5/1990 | Japan | G02B 27/46 |
| 2-148242 | 10/1992 | Japan | G02B 27/46 |

OTHER PUBLICATIONS

SU-1392-536A Abstract: Soviet, Mosc. Eng. Geodsky, "Coherent Spectrum Analyser Fourier Lens" Apr. 30, 1988, Derwent Publications, Ltd., London.

Abstract: Japan, Mitsubishi Denki et al., Apr. 22, 1983, Patent Abstracts of Japan, vol. 7, No. 96 (p. 193) & JP-A-58-21716.

*Primary Examiner*—Paul M. Dzierzynski
*Assistant Examiner*—John Juba, Jr.
*Attorney, Agent, or Firm*—Wenderoth, Lind & Ponack

[57] ABSTRACT

A Fourier transform lens assembly suited for use in an optical information processor includes a first lens group having a positive power, a second lens group having a negative power disposed on one side of the first lens group, and a third lens group having a positive power disposed on the side opposite to the first lens group with respect to the second lens group. The distance between a front focal plane and a back focal plane of the Fourier transform lens assembly is less than two times a focal length of the Fourier transform lens assembly.

1 Claim, 4 Drawing Sheets

FOURIER TRANSFORM LENS ASSEMBLY

This is a division application of Ser. No. 07/952,269, filed Sep. 28, 1992, now U.S. Pat. No. 5,383,056.

BACKGROUND OF THE INVENTION

1. Field of the Invention

The present invention relates generally to a visual recognition apparatus for use in, for example, a robot, and more particularly to an optical information processor for optically performing image processing or image recognition. The present invention also relates to a Fourier transform lens assembly for use in the optical information processor.

2. Description of the Prior Art

Recently, there have been strong demands in the field of image processing or image recognition towards a higher speed processing of a large number of pixels than that hitherto accomplished. To this end, the development of an optical information processor is being advanced by making use of a high-speed parallel operation function of light.

Japanese Laid-open Patent Publication (unexamined) No. 2-132412 discloses an optical information processor as shown in FIG. 1. In FIG. 1, reference numeral 20 denotes a TV camera, reference numeral 21 a first liquid crystal display for displaying an image picked up by the TV camera 20, reference numeral 22 a laser diode, reference numeral 23 a collimator lens for collimating light from the laser diode 22, and reference numeral 24 a first lens. The first liquid crystal display 21 is located on the front focal plane of the first lens 24. Reference numeral 25 denotes a second crystal liquid display located on the back focal plane of the first lens 24.

Furthermore, reference numeral 26 denotes a ROM (read-only memory), reference numeral 27 a second lens, and reference numeral 28 a photodetector. In the ROM 26 are written data of Fourier transform type computer-generated holograms calculated in advance with respect to a plurality of reference patterns, i.e., data of applied voltages corresponding to the transmittance of respective pixels on the second liquid crystal display 25. In calculating the Fourier transform type computer-generated holograms, a plurality of pixels on the second liquid crystal display 25 are rendered to be sampling points. The second liquid crystal display 25 and the photodetector 28 are located on the front focal plane and on the back focal plane of the second lens 27, respectively.

The optical information processor having the above-described construction operates as follows.

When an image of an object is picked up by the TV camera 20, it is displayed on the first liquid crystal display 21. The laser diode 22 applies to the first liquid crystal display 21 a coherent beam collimated by the collimator lens 23.

Because the first liquid crystal display 21 is located on the front focal plane of the first lens 24, a Fourier transform image of the object optically transformed by the first lens 24 is formed on the back focal plane of the first lens 24, i.e., on the second liquid crystal display 25. At this moment, upon input of the data stored in the ROM 26 into the second liquid crystal display 25, the transmittance of each of the pixels on the second liquid crystal display 25 is spatially modulated. As a result, each of the Fourier transform type computer-generated holograms of the specific reference patterns is displayed on the second liquid crystal display 25, which functions as an optical filter. Accordingly, on the second liquid crystal display 25, the Fourier transform image, which has optically been transformed by the first lens 24 from the input image of the object displayed on the first liquid crystal display 21, is superimposed on each of the Fourier transform images calculated in advance with respect to the specific reference patterns.

Furthermore, because the second liquid crystal display 25 is located on the front focal plane of the second lens 27, when the Fourier transform image of the object and that of a specific reference pattern coincide with each other, i.e., when both of them are indicative of the same object, a bright point appears on the back focal plane of the second lens 27 and is detected by the photodetector 28. In this way, an optical image processing is performed wherein an optical filter in the form of a computer-generated hologram displayed on the second liquid crystal display 25 functions as a matched filter.

The above optical information processor is disadvantageous in that the length of an optical path is elongated for the following reasons, thereby enlarging the size of the apparatus. If the wavelength of the laser diode 22, the pixel pitch of the first liquid crystal display 21, and the diameter of a Fourier transform image displayed on the second liquid crystal display 25 are $\lambda$, P, and D, respectively, the focal length (f) of the first lens 24 is given by $f=D \cdot P/\lambda$. When $P=50$ μm, $\lambda=0.8$ μm, and $D=60$ mm, a lens of $f=3,125$ mm is required. Accordingly, as shown in FIG. 1, the distance between the first liquid crystal display 21 and the second liquid crystal display 25 is $2 \cdot f=6,250$ mm. It must be said that this distance is extremely long.

SUMMARY OF THE INVENTION

The present invention has been developed to overcome the above-described disadvantages.

It is accordingly an object of the present invention to provide a Fourier transform lens assembly of which the distance between the front focal plane and the back focal plane is relatively short.

Another object of the present invention is to provide a Fourier transform lens assembly having a reduced lens length.

A further object of the present invention is to provide a small-sized optical information processor wherein an optical path is bent in the course of a Fourier transform optical system.

In accomplishing the above and other objects, a Fourier transform lens assembly according to the present invention comprises a first lens group having a positive power, a second lens group having a negative power disposed on one side of the first lens group, and a third lens group having a positive power disposed on the side opposite to the first lens group with respect to the second lens group. In this Fourier transform lens assembly, the distance between a front focal plane and a back focal plane is less than two times a focal length thereof.

Preferably, the first lens group and the second lens group constitute an afocal lens system, whereas the third lens group constitutes a focal lens system.

Advantageously, a medium having a refractive index greater than 1 is interposed between the afocal lens system and the focal lens system.

The Fourier transform lens assembly having the above-described construction can reduce the length of an optical path in an optical information processor.

In another aspect of the present invention, an optical information processor comprises an afocal lens system, a first spatial modulation element for displaying an input image, a mirror for bending an optical path, a focal lens system, and a second spatial modulation element for displaying spatial filters. The first spatial modulation element is disposed on one side of the afocal lens system, whereas the mirror is disposed on the other side of the afocal lens system. The focal lens system is disposed on the optical path bent by the mirror, and the second spatial modulation element is disposed on the side opposite to the mirror with respect to the focal lens system.

Furthermore, a Fourier transform optical system is constituted by the afocal lens system, the mirror, and the focal lens system. The first and second spatial modulation elements are located on a back focal plane and on a front focal plane of the Fourier transform optical system, respectively.

The optical information processor having the above-described construction can be made small, as compared with the conventional optical information processor as shown in FIG. 1.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 2:
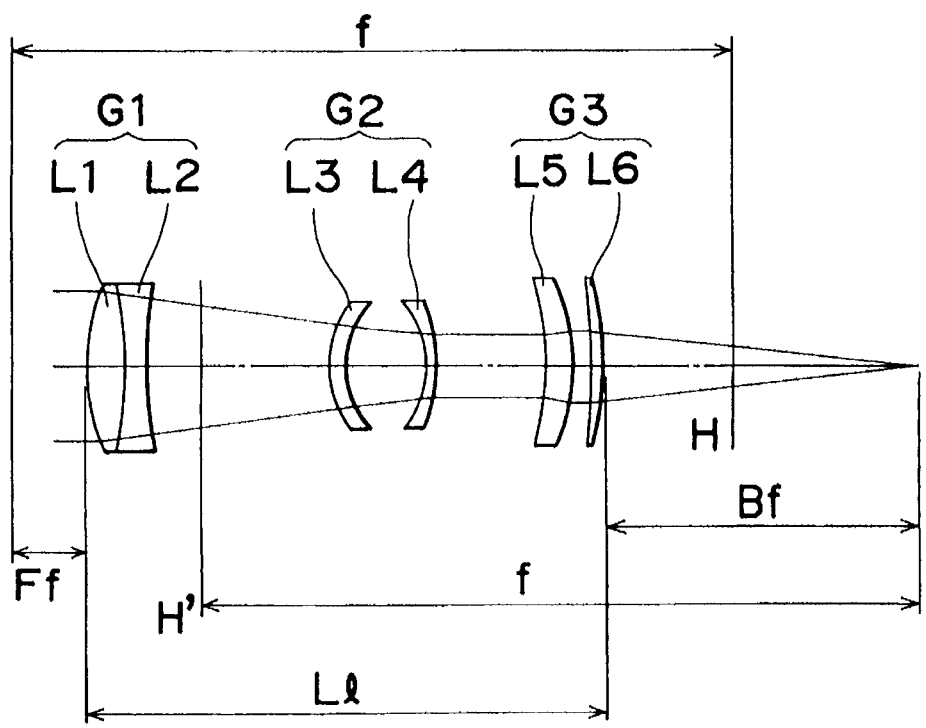
FIG. 2 is a schematic view of a Fourier transform lens assembly according to a first embodiment of the present invention.

Referring now to the drawings, there is shown in FIG. 2 a Fourier transform lens assembly according to a first embodiment of the present invention. The Fourier transform lens assembly shown in FIG. 2 comprises a front lens group G1, a middle lens group G2, and a rear lens group G3. The front lens group G1 comprises a biconvex lens L1 and a biconcave lens L2 combined with each other. The front lens group G1 has a positive power. The middle lens group G2 comprises a pair of negative meniscus lenses L3 and L4 and has a negative power, whereas the rear lens group G3 comprises a pair of positive meniscus lenses L5 and L6 and has a positive power. Table 1 indicates lens data when the focal length (f) is normalized to 100 mm.

TABLE 1

| No. of lens plane | Radius of Curvature (mm) | Plane Distance (mm) | Refractive Index (at 514.5 nm) |
|---|---|---|---|
| 1 | 26.47 | 5.12 | 1.62781 |
| 2 | −70.38 | 3.38 | 1.76788 |
| 3 | 68.76 | 25.08 | air |
| 4 | 15.04 | 2.13 | 1.56810 |
| 5 | 12.34 | 11.00 | air |
| 6 | −12.63 | 0.88 | 1.56810 |
| 7 | −23.98 | 15.43 | air |
| 8 | −42.03 | 4.03 | 1.81981 |
| 9 | −25.82 | 2.85 | air |
| 10 | −81.26 | 1.25 | 1.81981 |
| 11 | −43.24 | | air |

As described above, in this embodiment, the lens assembly is composed of three lens groups: a positive power lens group, a negative power lens group, and a positive power lens group. As a result, as shown in Table 1, the positional relationship between a front focal plane H and a back focal plane H' is opposite to that of an ordinary single lens. In other words, the back focal plane H' is positioned on the side of the object. This makes both the front focus Ff and the back focus Bf extremely short.

In this embodiment, Ff=0.11 f, Bf=0.43 f, and Ll (the total length of the lens assembly)=0.71 f. Accordingly, the distance between an object plane and a spectral plane is 1.25 f.

The performance of the Fourier transform lens assembly according to this embodiment is discussed hereinafter with reference to Table 2, Table 3, and FIGS. 3 to 5.

Figure 3:
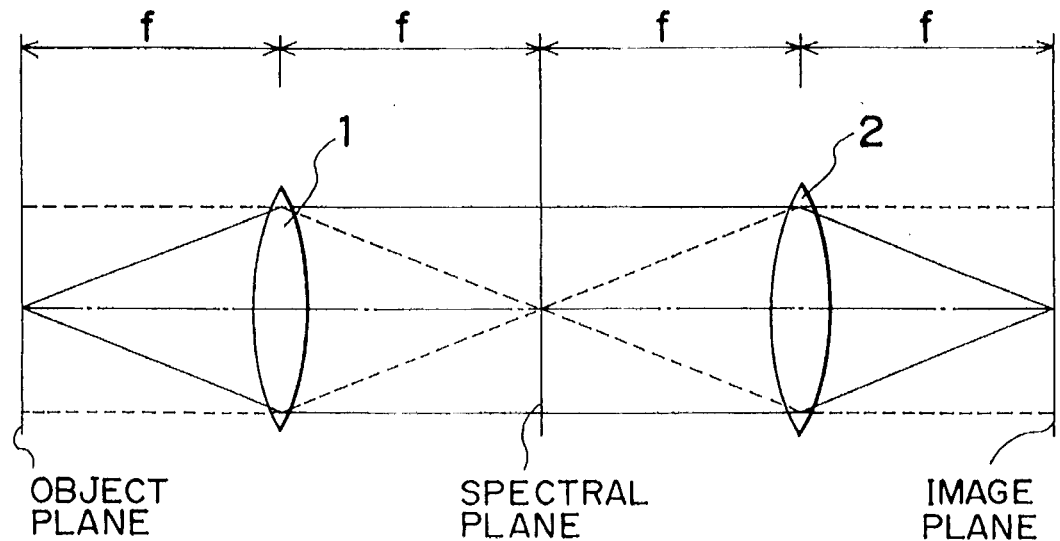
FIG. 3 is a schematic view explanatory of the image formation of an object and that of a pupil in a Fourier transform optical system.
Figures 4A, 4B:
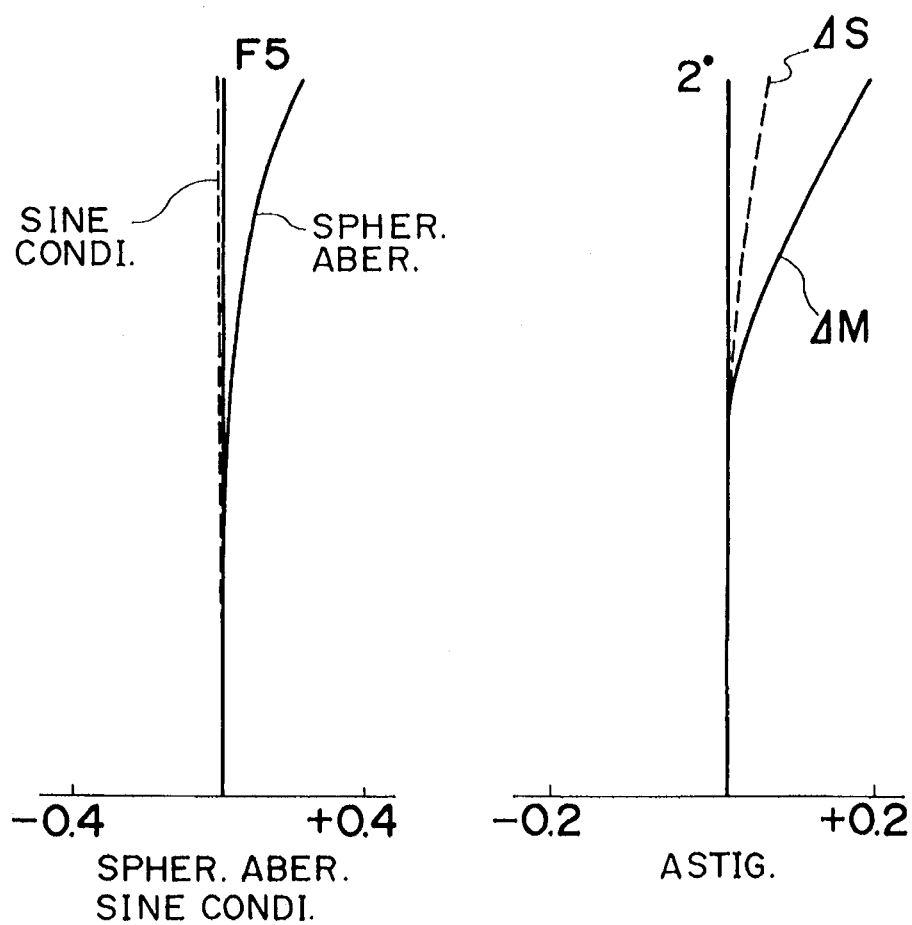
FIG. 4a is a graph of characteristic curves indicative of the spherical aberration in association with the image formation of an object.
FIG. 4b is a graph of characteristic curves indicative of an astigmatism in association with the image formation of the object.
Figure 5A:
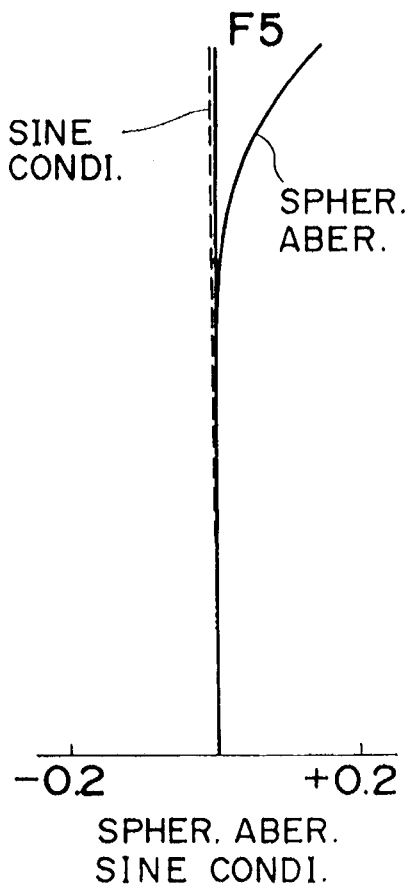
FIG. 5a is a graph similar to FIG. 4a, but indicative of the spherical aberration in association with the image formation of a pupil.
Figure 5B:
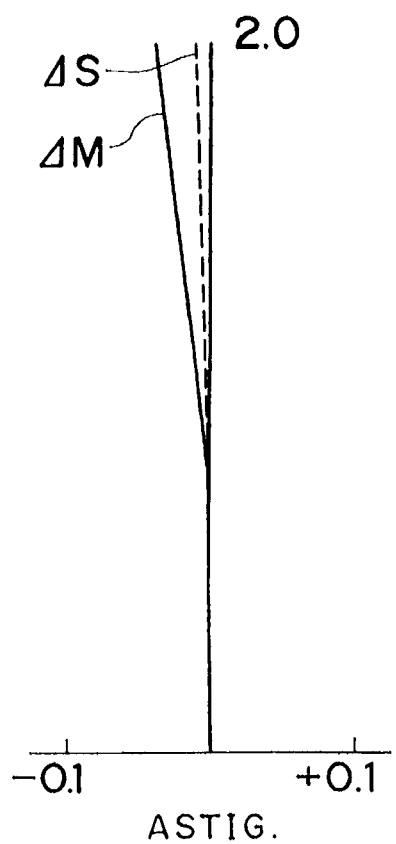
FIG. 5b is a graph similar to FIG. 4b, but indicative of the astigmatism in association with the image formation of the pupil.

FIG. 3 schematically depicts an image formation of an object and that of a pupil performed by two Fourier transform lenses. Table 2 is a table of Seidel aberration coefficients in association with the image formation of the object, i.e., that of a bundle of non-parallel rays among rays diffracted from the object plane. Table 3 is a table 10 of Seidel aberration coefficients in association with the image formation of the pupil, i.e., that of a bundle of parallel rays among the rays diffracted from the object plane. FIGS. 4a and 4b are indicative of a spherical aberration and an astigmatism in association with the image formation of an object, whereas FIGS. 5a and 5b are indicative of those in association with the image formation of the pupil.

Initially, the performance required for Fourier transform lenses is discussed with reference to FIG. 3, in which reference numerals 1 and 2 denote a first Fourier transform lens and a second Fourier transform lens, respectively. In this figure, solid lines indicate the image formation of the object, i.e., that of the bundle of non-parallel rays among the rays diffracted from the object plane, whereas dotted lines indicate the image formation of the pupil i.e., that of the bundle of parallel rays among the rays diffracted from the object plane.

TABLE 2

| No. of plane | I Spher. Aber. | II Coma Aber. | III Astigmatism | V Distor. Aber. | P Petzval |
|---|---|---|---|---|---|
| 1 | 12.81 | 3.39 | 0.90 | -0.62 | 1.46 |
| 2 | -3.68 | 0.76 | -0.16 | -0.05 | -0.07 |
| 3 | 0.003 | 0.04 | 0.57 | 0.81 | -0.63 |
| 4 | 0.76 | 0.90 | 1.07 | -4.13 | 2.41 |
| 5 | -2.82 | -3.20 | -3.63 | 7.44 | -2.94 |
| 6 | -11.2 | -5.94 | -3.16 | 3.21 | -2.87 |
| 7 | 0.66 | -0.09 | 0.01 | 0.21 | 1.51 |
| 8 | -0.13 | 0.04 | -0.01 | -0.29 | -1.07 |
| 9 | 2.22 | 2.39 | 2.58 | -4.67 | 1.75 |
| 10 | -0.33 | -0.05 | -0.01 | 0.09 | -0.55 |
| 11 | 1.66 | 1.73 | 1.81 | -2.97 | 1.04 |
| SUM | -0.01 | -0.04 | -0.03 | -0.96 | 0.03 |

Table 2 shows the case wherein the third-order aberration coefficient, i.e., Seidel aberration coefficient is normalized to f=1 mm in the image formation of the object by the Fourier transform lens assembly according to the present invention.

As shown in Table 2, the Fourier transform lens assembly according to the present invention almost completely satisfies the conditions which Fourier transform lenses must satisfy in association with the image formation of the object, i.e., the conditions of I=II=III=P=0 and V=-1.

Table 3 shows the case wherein the third-order aberration coefficient, i.e., Seidel aberration coefficient is normalized to f=1 mm in the image formation of the pupil by the Fourier transform lens assembly according to the present invention.

TABLE 3

| No. of plane | I Spher. Aber. | II Coma Aber. | III Astigmatism | V Distor. Aber. | P Petzval |
|---|---|---|---|---|---|
| 1 | 3.06 | 1.33 | 0.57 | -0.70 | 1.04 |
| 2 | 0.03 | 0.10 | 0.33 | 0.71 | -0.55 |
| 3 | 2.25 | 0.91 | 0.37 | -0.86 | 1.75 |
| 4 | 0.03 | -0.18 | 1.18 | 0.75 | -1.07 |
| 5 | -0.01 | 0.04 | -1.54 | -0.88 | 1.51 |
| 6 | -0.84 | -0.94 | -1.05 | -4.40 | -2.87 |
| 7 | -9.60 | -3.54 | -1.30 | 1.56 | -2.94 |
| 8 | 5.21 | 1.75 | 0.59 | -1.00 | 2.41 |
| 9 | -0.13 | 0.05 | -0.02 | -0.24 | -0.63 |
| 10 | 0.01 | -0.01 | 0.10 | 0.34 | -0.07 |
| 11 | 1.59 | 0.36 | 0.79 | -5.03 | 1.46 |
| SUM | 0.18 | -0.13 | 0.04 | -0.96 | 0.03 |

As shown in Table 3, the Fourier transform lens assembly according to the present invention almost completely satisfies the conditions which Fourier transform lenses must satisfy in association with the image formation of the pupil, i.e., the conditions of I=II=III=P=0 and V=-1 except the spherical aberration coefficient I and the Coma aberration coefficient II.

As to the spherical aberration coefficient I and the Coma aberration coefficient II, lenses having a large F-number are not significantly affected thereby. In the case of the Fourier transform lens assembly according to the present invention, when the pixel pitch of the liquid crystal display placed on the object plane is P=50 μm and the wavelength of the laser is λ=0.8 μm, the diffraction angle of diffracted light in association with the image formation of the pupil is $\sin^{-1}(\lambda/P)=0.92°$. Accordingly, the effective F-number=1/sin(0.92°)/2=31, and no problem is encountered in the performance of image formation, as can be understood from FIGS. 5a and 5b.

As described hereinabove, the lens assembly according to the present invention satisfactorily the performs as the Fourier transform lens assembly. Furthermore, the provision of the three lens groups composed of a positive power lens group, a negative power lens group and a positive power lens group makes the positional relationship between the front focal plane H and the back focal plane H' opposite to that of a single ordinary lens. Because of this, the back focal plane H' can be positioned on the side of the object plane.

Figure 1:
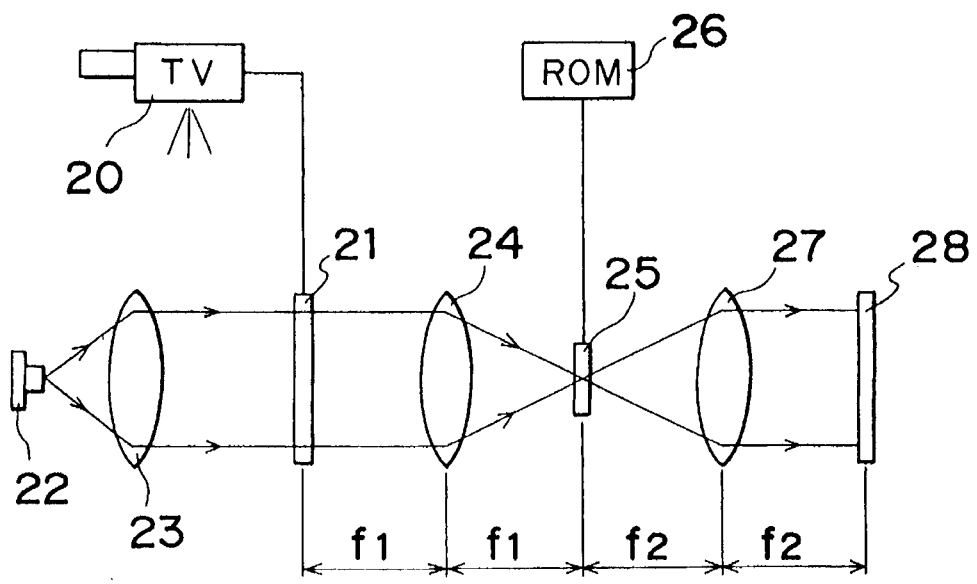
FIG. 1 is a schematic view of a conventional optical information processor.

As a result, the distance between the front focal plane H and the back focal plane H' can be considerably shortened to 1.25 f. This value is about 60% of the distance 2 f in the conventional case shown in FIG. 1. Accordingly, the use of the Fourier transform lens assembly according to the present invention can considerably reduce the size of an optical information processor.

Figure 6:
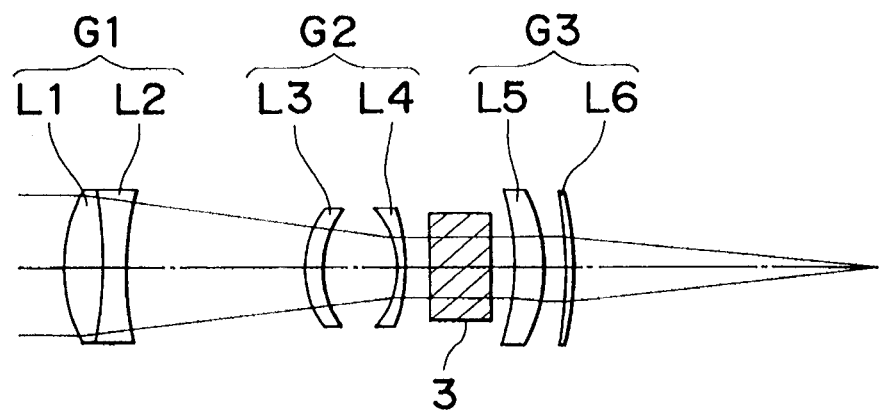
FIG. 6 is a view similar to FIG. 2, but according to a second embodiment of the present invention.

FIG. 6 depicts a Fourier transform lens assembly according to a second embodiment of the present invention. The Fourier transform lens assembly shown in FIG. 6 comprises a front lens group G1 having a positive power, a middle lens group G2 having a negative power, and a rear lens group G3 having a positive power. The front lens group G1 comprises a biconvex lens L1 and a biconcave lens L2 combined with each other. The middle lens group G2 comprises a pair of negative meniscus lenses L3 and L4, whereas the rear lens group G3 comprises a pair of positive meniscus lenses L5 and L6. The Fourier transform lens assembly according to this embodiment further comprises a parallel plate interposed between the middle lens group G2 and the rear lens group G3. Table 4 indicates lens data at the time the focal length (f) is normalized to 100 mm.

TABLE 4

| No. of lens plane | Radius of Curvature (mm) | Plane Distance (mm) | Refractive Index (at 514.5 nm) |
|---|---|---|---|
| 1 | 26.47 | 5.12 | 1.62781 |
| 2 | -70.38 | 3.38 | 1.76788 |
| 3 | 68.76 | 25.08 | air |
| 4 | 15.04 | 2.13 | 1.56810 |
| 5 | 12.34 | 11.00 | air |
| 6 | -12.63 | 0.88 | 1.56810 |
| 7 | -23.98 | 0.43 | air |
| 8 | ∞ | 7.69 | 1.81981 |
| 9 | ∞ | 1.00 | air |
| 10 | -42.03 | 4.03 | 1.81981 |
| 11 | -25.82 | 2.85 | air |
| 12 | -81.26 | 1.25 | 1.81981 |
| 13 | -43.24 |  | air |

The Fourier transform lens assembly according to the second embodiment differs from that according to the first embodiment in that the former is provided with the parallel plate 3. Accordingly, the radius of curvature of the 8th plane and that of the 9th plane are infinity, and the 8th to 11th planes in Table 1 correspond to the 10th to 13th planes in Table 4, respectively. In Table 1, the spatial distance between the 7th and 8th planes is chosen to be 15.43 mm, whereas, in Table 4 indicating the second embodiment, the spatial distance between the 7th and 8th planes is chosen to be 0.43 mm, the spatial distance between the 8th and 9th planes is chosen to be 7.69 mm while a medium having a refractive index of 1.81981 is disposed within the spatial distance between the 8th and 9th planes, and the spatial distance between the 9th and 10th planes is chosen to be 1 mm. Accordingly, when the distance between the 7th and 10th planes is converted to the spacial distance within which nothing except air exists, it becomes 15.43 mm which is the same as the spatial distance between the 7th and 8th planes in Table 1.

In the Fourier transform lens assembly according to this embodiment, the 7th plane is an exit plane of the middle lens group, and the exit angle thereof is about 0.02°. Because light is emitted, as almost parallel light, from the 7th plane, the positive power front lens group G1 and the negative power middle lens group G2 constitute an afocal system. Because of this, even if the parallel plate 3 is disposed behind the middle lens group G2, if the distance converted to the length of air is the same, the front focus Ff, the back focus Bf, and the aberrations become equivalent to those of the lens assembly shown in Table 1. The length Ll of the lens assembly, however, is reduced to 0.64 f.

As described hereinabove, the lens assembly according to this embodiment has the properties of the Fourier transform lens assembly, and comprises an afocal system including a positive power front lens group G1 and a negative power middle lens group G2, a positive power rear lens group G3, and a parallel plate 3 having a refractive index greater than 1 and interposed between the afocal system and the rear lens group G3. Because the length Ll of the lens assembly according to the second embodiment is 10% shorter than that of the lens assembly according to the first embodiment, the employment of the former can further reduce the size of an optical information processor.

It is to be noted that the parallel plate 3 may be replaced by silicone oil or the like.

Figure 7:
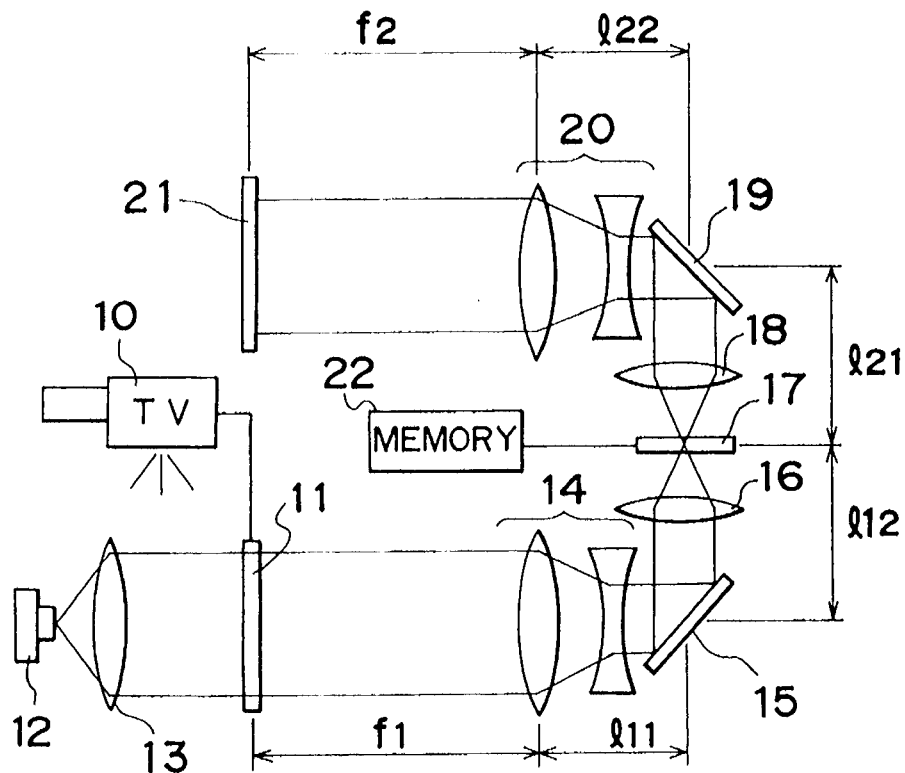
FIG. 7 is a schematic view of an optical information processor according to the present invention.

FIG. 7 schematically depicts an optical information processor according to the present invention, which comprises a TV camera 10, a first liquid crystal display 11 for displaying an input image picked up by the TV camera 10, a laser diode 12, a collimator lens 13 for collimating light from the laser diode 12, and a first afocal lens system 14. The first liquid crystal display 11 comprises a spatial optical modulation element. The optical information processor of FIG. 7 further comprises a first mirror 15 and a second lens system 16. The first afocal lens system 14, the first mirror 15, and the second lens system 16 constitute a first Fourier transform optical system.

The optical information processor of FIG. 7 also comprises a second liquid crystal display 17 located on the back focal plane of the first Fourier transform optical system, a third lens system 18, a second mirror 19, and a fourth afocal lens system 20. The third lens system 18, the second mirror 19, and the fourth afocal lens system 20 constitute a second Fourier transform optical system. The second liquid crystal display 17 is located on the front focal plane of the second Fourier transform optical system. An photodetector 21 such A, for example, a CCD is disposed on the back focal plane of the second Fourier transform optical system. The second liquid crystal display 17 is operatively coupled with a memory 22 in which are stored data of spatial filters such as, for example, computer-generated holograms to be displayed on the second liquid crystal display 17.

Figure 8:
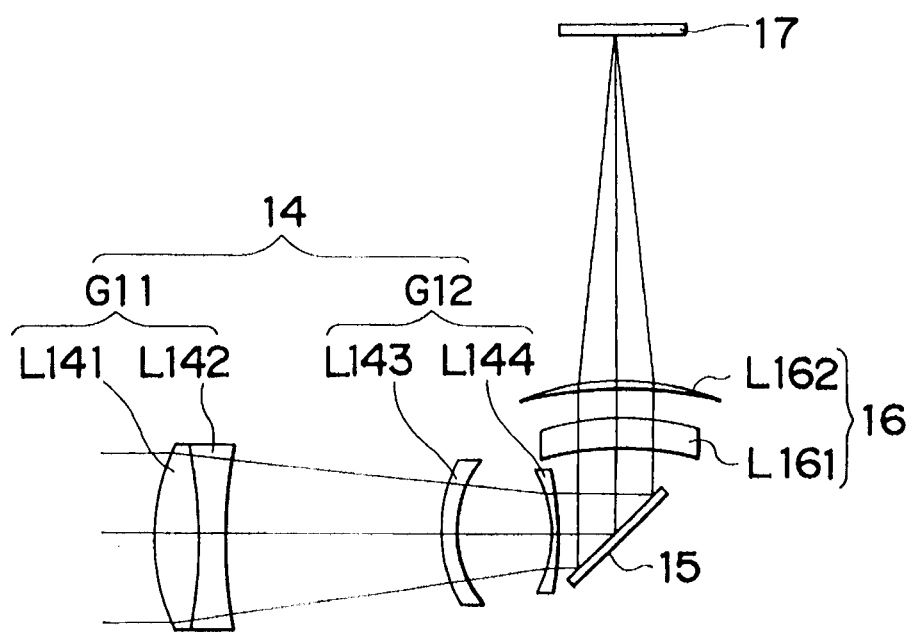
FIG. 8 is a schematic view of a Fourier transform optical system employed in the optical information processor of FIG. 7.

The first Fourier transform optical system is preferably constructed as shown in FIG. 8. The first afocal lens system 14 includes a positive power lens group G11 and a negative power lens group G12. The positive power lens group G11 includes a biconvex lens L141 and a biconcave lens L142, whereas the negative power lens group G12 includes a pair of negative meniscus lenses L143 and L144. The first mirror 15 is disposed on the rear side of the first lens system 14 to bend an optical path. The second lens system 16 includes a pair of positive meniscus lenses L161 and L162. The second liquid crystal display 17 is disposed on the combined focal plane of the first and second lens systems 14 and 16. In other words, the sum of l11 and l12 shown in FIG. 7 is equal to the combined focal length f1 of the first and second lens systems 14 and 16.

Also, in the second Fourier transform optical system including the third lens system 18, the second mirror 19, and the fourth lens system 20, the sum of l21 and l22 shown in FIG. 7 is equal to the combined focal length f2 of the third and fourth lens systems 18 and 20.

Table 5 indicates lens data of the first lens system 14 wherein the combined focal length f1 of the first Fourier transform optical system is chosen to be f1=100 mm.

TABLE 5

| No. of lens plane | Radius of Curvature (mm) | Plane Distance (mm) | Refractive Index (at 514.5 nm) |
|---|---|---|---|
| 1 | 26.47 | 5.12 | 1.62781 |
| 2 | −70.38 | 3.38 | 1.76788 |
| 3 | 68.76 | 25.08 | air |
| 4 | 15.04 | 2.13 | 1.56810 |
| 5 | 12.34 | 11.00 | air |
| 6 | −12.63 | 0.88 | 1.56810 |
| 7 | −23.98 | | air |

Table 6 indicates lens data of the second lens system 16 wherein the combined focal length f1 of the first Fourier transform optical system is chosen to be f1=100 mm.

TABLE 6

| No. of lens plane | Radius of Curvature (mm) | Plane Distance (mm) | Refractive Index (at 514.5 nm) |
|---|---|---|---|
| 1 | −42.03 | 4.03 | 1.81981 |
| 2 | −25.82 | 2.85 | air |
| 3 | −81.26 | 1.25 | 1.81981 |
| 4 | −43.24 | | air |

The optical information processor having the above-described construction operates as follows.

When an image of an object is picked up by the TV camera 10, it is displayed on the first liquid crystal display 11. To the first liquid crystal display 11 is irradiated a coherent beam from the laser diode 12 which has been collimated by the collimator lens 13. Because the first liquid crystal display 11 is disposed on the front focal plane of the first Fourier transform optical system constituted by the first and second lens systems 14 and 16, a Fourier transform image of the object optically converted by the first and second lens systems 14 and 16 is formed on the back focal plane of the first Fourier transform optical system, i.e., on the second liquid crystal display 17.

At this moment, upon input of the data stored in the memory 22 into the second liquid crystal display 17, the transmittance of each of the pixels on the second liquid crystal display 17 is spatially modulated. As a result, each of the Fourier transform type computer-generated holograms of the reference patterns is displayed on the second liquid crystal display 17, which functions as an optical filter.

Accordingly, on the second liquid crystal display 17, the Fourier transform image, which has optically been transformed by the first and second lens systems 14 and 16 from the input image of the object displayed on the first liquid crystal display 11, is superimposed on each of the Fourier transform images calculated in advance with respect to the reference patterns.

Furthermore, because the second liquid crystal display 17 is disposed on the front focal plane of the second Fourier transform optical system, when the Fourier transform image of the object and that of a reference pattern are in agreement with each other, i.e., when both of them are indicative of the same object, a bright point appears on the back focal plane of the second Fourier transform optical system and is detected by the photodetector 21. In this way, an optical image processing is performed wherein an optical filter in the form of a computer-generated hologram displayed on the second liquid crystal display 25 functions as a matched filter.

As described hereinabove, the first Fourier transform optical system comprises the first afocal lens system 14, the second focal lens system 16, and the first mirror 15 interposed between the first and second lens systems 14 and 16, whereas the second Fourier transform optical system comprises the third focal lens system 18, the fourth afocal lens system 20, and the second mirror 19 interposed between the third and fourth lens systems 18 and 20. This construction enables the optical path to be bent in each of the afocal lens systems, thereby facilitating adjustments of the optical systems, as compared with the case wherein the optical path is bent in a focal lens system or systems. Accordingly, the optical path can easily be bent in three dimensions in the Fourier transform optical systems. This fact makes it possible to reduce the size of an optical information processor.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A Fourier transform lens assembly comprising:

a first lens group having a positive power and comprising at least two lenses combined with each other;

a second lens group having a negative power and comprising at least two meniscus lenses;

a third lens group having a positive power and comprising at least two meniscus lenses, said first, second and third lens groups being disposed in order from an object side; and a single parallel plate interposed between said second and third lens groups so as to substantially reduce an air gap defined therebetween, said parallel plate extending in a direction perpendicular to an optical axis, wherein said first and second lens groups together constitute an afocal system, and wherein said afocal system constituted by said first and second lens groups constitutes a means to pass a substantially collimated beam to said parallel plate when a substantially collimated beam is input into said first lens group in a direction toward said second lens group.

\* \* \* \* \*